A. H. WHEELER.
BLOWER FOR PEAS OR THE LIKE.
APPLICATION FILED NOV. 6, 1908.

921,764.

Patented May 18, 1909.
5 SHEETS—SHEET 2.

Witnesses:
C. F. Wesson
C. J. Hartnett

Inventor:
A. H. Wheeler.
By Attorneys
Southgate & Southgate

A. H. WHEELER.
BLOWER FOR PEAS OR THE LIKE.
APPLICATION FILED NOV. 6, 1908.

921,764.

Patented May 18, 1909.
5 SHEETS—SHEET 3.

A. H. WHEELER.
BLOWER FOR PEAS OR THE LIKE.
APPLICATION FILED NOV. 6, 1908.

921,764.

Patented May 18, 1909.
5 SHEETS—SHEET 5.

Witnesses:
C. F. Meson
C. I. Hartnett

Inventor
A. H. Wheeler.
By Attorneys
Southgate & Southgate

UNITED STATES PATENT OFFICE.

ALBERT HARRY WHEELER, OF WORCESTER, MASSACHUSETTS.

BLOWER FOR PEAS OR THE LIKE.

No. 921,764.　　　　Specification of Letters Patent.　　　Patented May 18, 1909.

Application filed November 6, 1908. Serial No. 461,303.

*To all whom it may concern:*

Be it known that I, ALBERT HARRY WHEELER, a citizen of the United States, residing at Worcester, in the county of Worcester and State of Massachusetts, have invented a new and useful Blower for Peas or the Like, of which the following is a specification.

This invention relates to a blower for peas, beans, and other small light projectiles.

The principal objects of the invention are to provide for loading the blower with a comparatively large number of projectiles so that it can be used for a long period of time without reloading; to provide means whereby with simple manipulation of the device or a small change in construction a volley may be discharged, or a single shot; to provide simple and efficient means for preventing the passage of moisture into the magazine for holding the projectiles and for preventing the passage of the projectiles back into the mouth of the person using the blower; to provide in connection with the main body of the blower a discharge tube made in readily removable sections so that the whole implement can be taken apart and carried around in very small compass; to provide a construction in which the projectiles do not pass directly from the reservoir or receptacle for holding them into the discharge tube or barrel, but in which they pass into and through the mouth piece or a passage especially designed for receiving them and directing them singly, or by volleys, into the barrel, whereby the kind of discharge can be controlled, and in which the barrel can be above, below or at the side of, or within the reservoir; and to provide improvements in the construction and manufacture of the device whereby it will be efficient in operation and can be made in a very simple manner of sheet metal.

Further objects and advantages of the invention will appear hereinafter.

Reference is to be had to the accompanying drawings, in which—

Referring first to the form shown in the first four figures, a reservoir or receptacle 40 is shown for receiving peas, beans, or other projectiles. This is provided with a removable telescoping section 41, in this instance forming a cap or cover, both of which parts have openings 42 which are adapted to come into registration when said parts are turned one on the other, to permit of loading the reservoir. The two parts 40 and 41 preferably are held together by a circumferential groove and bead 43, which register and which permit of rotary motion without getting the openings out of registration, or the barrel displaced. The groove and bead are small so that the two parts can be separated longitudinally, and if desired the implement can be loaded in this way and the openings 42 omitted.

The reservoir or receptacle 40 is shown as provided with an annular enlargement 44 for receiving a supporting and centering device 45. The latter is held accurately in the reservoir by being forced into the enlargement, and is provided with a central tube 46 which supports the end of the discharge tube or barrel 47 and keeps the latter in central position, the other end being removably held and centered by a tube or projection 48 on the end of the reservoir. The rear end of the tube 46 extends out into an enlargement 49 on the mouth-piece 50, which, in this form of the invention is integrally connected with the reservoir or receptacle and is located behind it. The end of the enlargement constitutes a shoulder serving as means to prevent the discharge conduit being pushed too far in. The barrel 47 and tube 46 together constitute the discharge conduit. The mouth-piece is provided with a restricted opening 51 formed by integral flanges at the end for preventing the projectiles from falling out, and through which air is discharged from the mouth of the operator directly into the end of the tube 46, and from there into the barrel, so that the barrel does not communicate with the main reservoir or receptacle in this case, and the projectiles enter the mouth piece at the sides, as clearly appears in Fig. 3 before they are discharged through the barrel. The projectiles held in the reservoir escape into the mouth-piece directly behind the end of the tube 46 through an opening 52 in the supporting member 45 and then along the passages at the side of the tube 46. In this form, even when the instrument is tilted up at the front for firing, the end of the barrel does not come beneath the reservoir; as a matter of fact this is a virtually multiple reservoir as no matter how it is held the projectiles will be guided below the end of the barrel by the sides of the mouth-piece and the plate 54 and if it contains enough they will fill the sides and top.

In the mouth-piece immediately at the rear of the end of the tube 46 is shown a moisture check 53. This is designed to divide the air currents and causes them to enter the open end of the tube from two directions. It prevents the passage of moisture from the mouth-piece into the barrel. In the front of this check is shown a curved guide-plate 54 which if it is of such width as completely to shut off the passage of air over the plate has an opening which may be at the center as shown and it serves for receiving the projectiles from the reservoir and directing them back into proper position for being discharged into the barrel. The shape of this guide-plate can be varied within wide limits, and the way in which it directs the projectiles into position will depend upon its form. This feature will be referred to hereinafter. This curved guide-plate 54 preferably is at least of such width as to prevent the peas from passing out of the lower end of the reservoir into the bottom of the mouth-piece when the device is held in the inclined shooting position, but may be sufficiently narrow to allow the passage of air above it along its entire length in which case the central opening is not required. It is shown as having two longitudinal moisture checks 55. The discharge conduit in this form is shown as comprising, in addition to the parts 46 and 47, a plurality of telescoping sections 56. Each of these telescoping sections is provided with an enlarged portion 57, preferably on the end toward the reservoir, adapted to fit the forward end of the section to the left which is provided with a bead 58 fitting a groove 59 in the enlarged portion 57. This construction provides for readily placing the parts together, and for registering them so that they will come in proper position. By having the enlarged ends of the tubes at the rear thereof and covering the smaller front ends of the tubes or sections at the left, and by having the same construction in the connection of the parts 40 and 41, some additional efficiency is secured as any imperfection in the joints will not cause as great an amount of air pressure to be lost as would be the case if the parts were made in the reverse positions. In addition to this the groove and bead afford additional tightness of the joint so as further to guard against the escape of air.

By using a barrel made of telescoping sections the whole device can be taken apart and can be carried around in the pocket or in a small receptacle, and if any part of the barrel is injured it need not impair the usefulness of the whole instrument, as it can be removed, and if desired, replaced by another. Slits 60 are shown in the ends of the sections 56 and member 40 to permit of easily and readily fitting the parts together.

Figure 4:
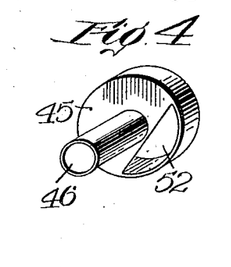
Fig. 4 is a perspective view of one of the elements shown in Figs. 2 and 3.
Figure 5:
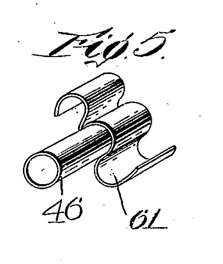
Fig. 5 is a perspective view of a modification of the same.

In Fig. 5 is shown a modification of the construction shown in Fig. 4, involving an open frame 61 for holding the tube 46 in place, which itself is held in position in the enlargement 44, or if desired soldered directly to the walls of the reservoir without any enlargement. In this case the projectiles escape back into the mouth-piece all around the frame 61.

Figure 6:
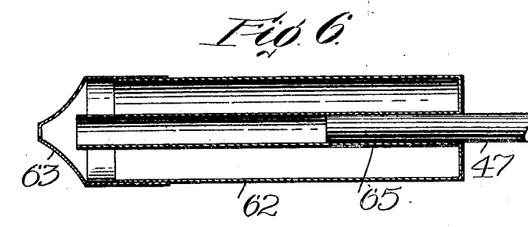
Figs. 6 and 7 are longitudinal sectional views showing modified forms.

In the form of the invention shown in Fig. 6, the reservoir 62 telescopes into the mouth-piece 63 which is enlarged at the inner end to receive the end of the same. The mouth-piece is preferably flattened into a form to guide the peas into firing position directly behind the end of the discharge conduit, which in this case consists of the barrel 47 and a tube 65. The latter is shown as secured to the end of the reservoir and extending back into the mouth-piece. The barrel enters the tube 65 so that it is separable from the reservoir. The guide tube 65 in addition to serving the same purpose as the tube 48, is shown as longer than the reservoir tube and projects beyond it, first for the purpose of bringing it well into it, and second to assist the loading of the reservoir when the cover or mouth piece is removed. The tube serves as a guide for the hand in loading as it projects up above the reservoir. When the latter is held in inverted position the peas will not drop into the tube.

Figure 7:
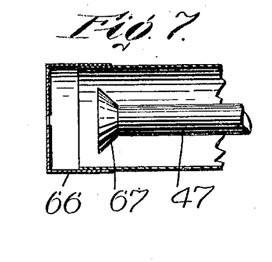

In Fig. 7 is shown a form in which a flat mouth-piece 66 is used, and in this case an enlarged or funnel end 67 is employed for the barrel or outlet tube 47. This serves to guide the projectiles from the firing position into the barrel for expulsion.

Figure 1:
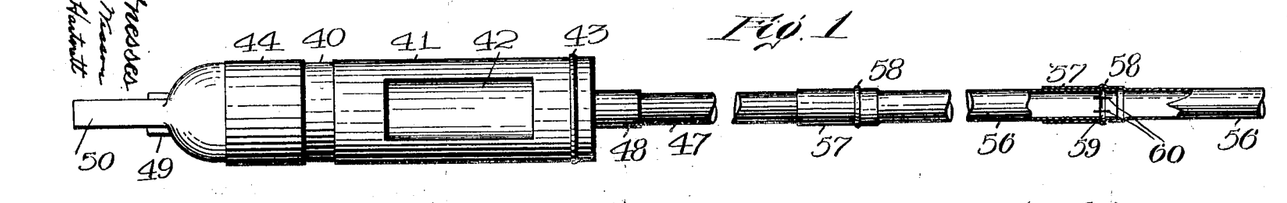
Figure 1 is a side elevation of a preferred form of the invention partly in section.
Figure 2:
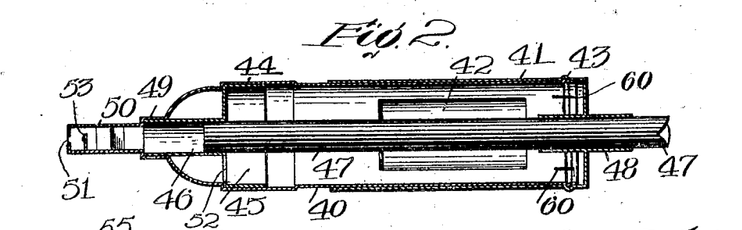
Fig. 2 is a longitudinal sectional view of a portion of the same.
Figure 3:
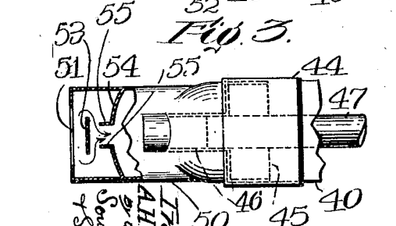
Fig. 3 is a plan of the mouth piece thereof.
Figure 8:
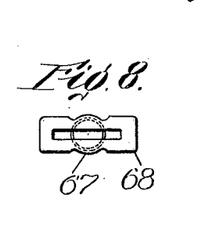
Fig. 8 is an end view of a mouth-piece slightly modified.

In Fig. 8 a form of mouth-piece 68 is shown in which instead of the enlargement 49 shown in Figs. 1, 2 and 3, the bottom and top walls of the mouth-piece are pressed inwardly on a curve 67 so as to receive the tube 46 or 65 or the end of the barrel 47 as desired. This forms a kind of corrugated construction.

In Figs. 9 to 13 other forms of the invention are shown, in which the device has a general flat construction, but the barrel or discharge tube is centrally located in the same sense as before, being situated within the reservoir chamber which is of double construction in this case.

Figure 9:
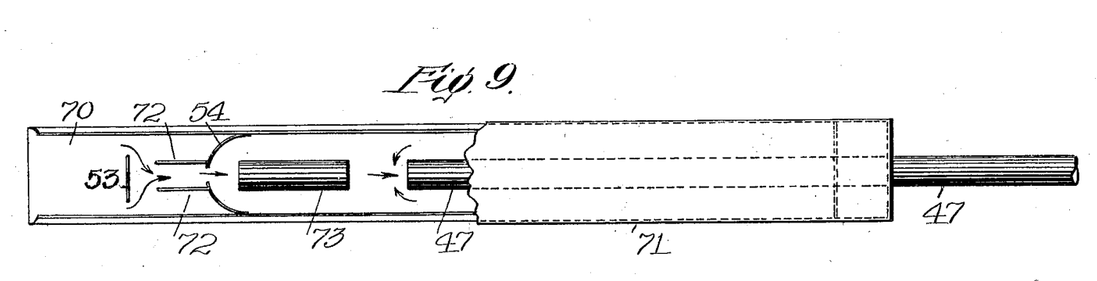
Fig. 9 is a plan of another modified form showing parts broken away to illustrate interior construction.
Figure 10:
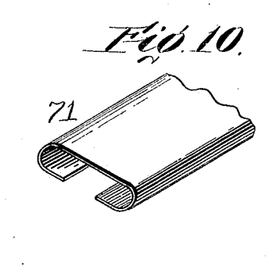
Fig. 10 is a perspective view of one end of one of the parts of the same.

In the form shown particularly in Fig. 9 the main part 70 of the device is provided with a sliding cover 71 which may be moved off the end to allow for loading. In this figure and many others, one part is referred to as the reservoir and the other as the cover, but it is to be understood that either may fit outside the other and the word cover is not understood to apply exclusively to the outer one. In this case the end of the mouth-piece may be open if desired or may be constructed like the end shown in the first three figures. The moisture check 53 and the curved guide plate 54 are shown, the latter having its opening at the center, and being provided with side moisture checks 72. Immediately in front of the central opening in the guide-plate 54 is shown a tubular member 73 serving to prevent the removable barrel being pushed in so far as to cut off the supply of peas and to receive the current of air and direct it into the barrel 47. It will be seen that in this case there is a reservoir on each side of the barrel, and that the projectiles can be directed into the barrel from either side. As a general thing they come indirectly from both sides.

Figure 11:
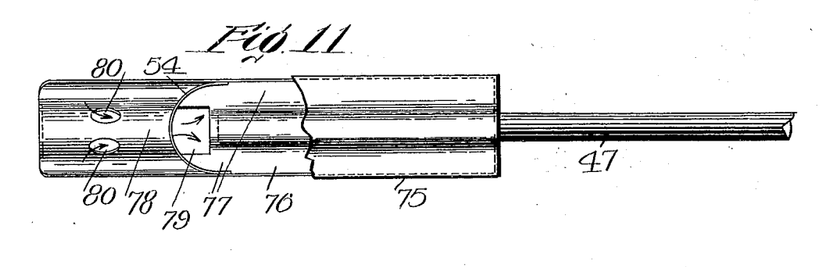
Fig. 11 is a plan of another modified form.
Figure 12:
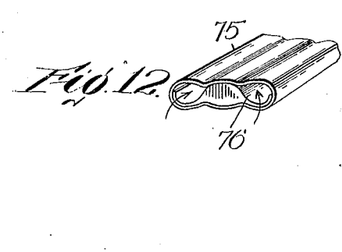
Fig. 12 is a perspective view of a portion of the same.
Figure 13:
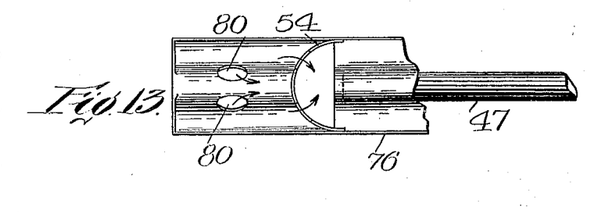
Fig. 13 is a fragmentary plan of a similar form.

In the form shown in Figs. 11 and 12 the cover 75 is of corrugated form and the main part 76 of the construction is provided with two continuous side passages 77 and with a central passage 78 formed from a single piece of sheet metal, and providing two reservoirs or magazines for the projectiles on the sides, and a central space for the barrel 47. In this case the curved plate 54 is shown and the wall of the central passage 78 is provided with an opening 79 for directing air into the end of the barrel. The air comes from the mouth of the user through the side passages down through openings 80 which receive the air from above and direct it beneath through an opening in the plate 54 into the opening 79 as shown in Fig. 11, or receive it from the central passage below as shown in Fig. 13, in which the cover 75 is not shown, and direct it above the sheet metal wall through one or more openings in the plate 54. If the air is directed through a central opening in the plate 54 directly toward the end of the barrel 47, as shown in Fig. 11, a volley will be delivered, but if it is divided and directed to the barrel from one or both sides as shown in Fig. 13, the supply of peas will be checked and only one or at the most, a small number delivered at each shot.

Figure 14:
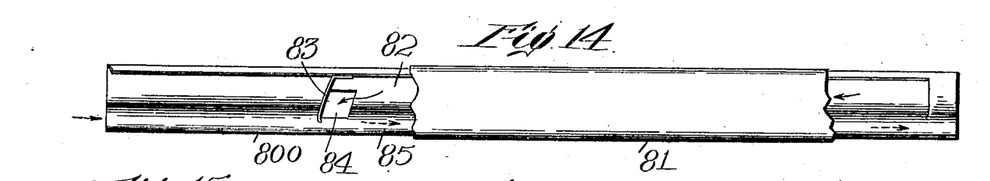
Fig. 14 is a plan of another modification partly broken away.
Figures 15, 16, 17, 18, 19, 20, 21, 22:
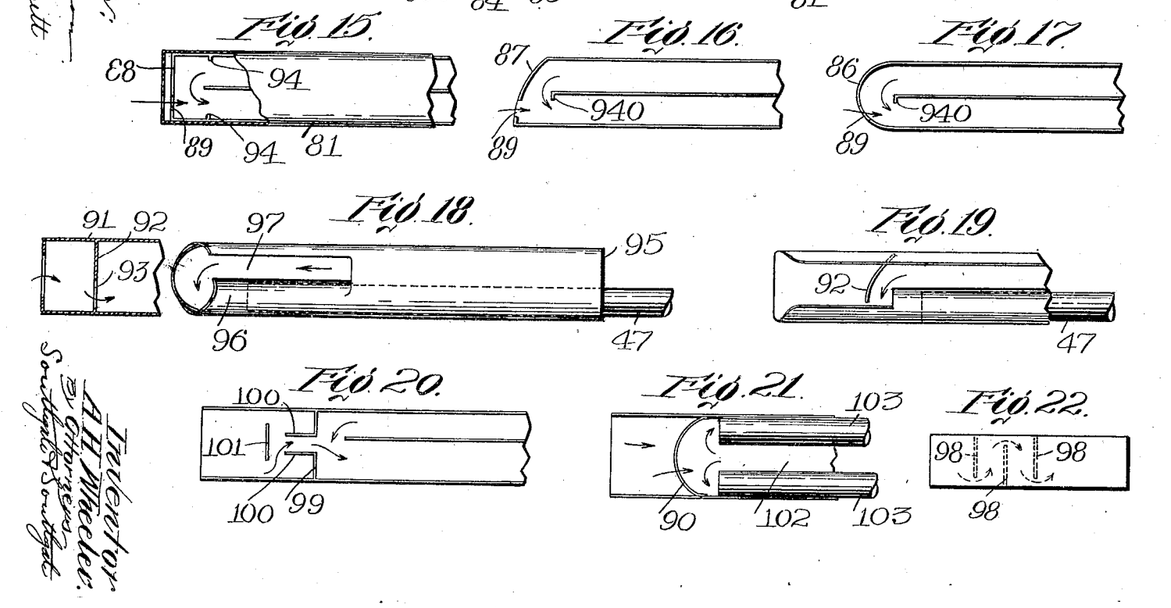
Figs. 15, 16 and 17 are similar views showing three forms of one portion of the device.
Figs. 18, 19, 20 and 21 are similar views showing further modifications, the cover appearing in Fig. 18 in section.
Fig. 22 is a plan showing an arrangement of moisture checks which can be adopted in many of the forms.

On the third sheet of the drawings are shown several forms of the invention in which the reservoir assumes such a shape that it constitutes hardly more than a feed-tube, and it is located at the side of an outlet or passage, from which the barrel extends. In Fig. 14, for example, the device is made in two parts 800 and 81, the latter of which constitutes a telescoping cover. The main part 800 is of a general S-shape in cross-section, in one of the halves 82 of which the peas are loaded, and from which they pass along a guide plate 83 into and through an opening 84 into the other part 85, from which they are discharged in the direction of the dotted arrows. The curved or slanting plate 83 preferably is of such dimension as to prevent the peas from falling out of the lower end of the reservoir when held in inclined position for shooting, but sufficiently narrow to allow the passage of air over it along its entire length. The operation of this form of the device will be obvious. It will be seen that the peas are guided in a continuous line from the feed tube or reservoir around in back of the barrel in firing position. By varying the shape of this guide plate as suggested in Figs. 15, 16 and 17, constructions can be obtained which affect the manner of delivery of the peas from the firing point into the barrel. In Fig. 17 the continuous circular guide 86 has a greater tendency to deliver a continuous volley than the guide plate 87 shown in Fig. 16, which terminates abruptly in the side wall of the firing barrel, extended. In Fig. 15 the guide plate 88 is straight or nearly so, and the general effect is to feed the peas into firing position less rapidly than in any of the other forms. In this form it will be seen that if the device is held in an inclined position for firing in such a way that the barrel is below the feed tube the supply of peas in the feed tube will be acted upon by gravity in such a way as to feed continuously into the barrel from the firing point. If a continuous current of air is blown against the peas in the firing position through the openings 89 the effect will be to deliver a continuous volley into and out of the barrel. However, if the device is held in inclined position for firing in such a way that the barrel is above the feed tube, a current of air striking the peas in firing position directly at the end of the barrel will expel such peas into and through the barrel as may at that time be in firing position, and the remaining ones will be held in check in the feed tube by a current of air so long as it is continuous. When the current of air ceases, the peas will then be fed by gravity down into the feed tube and up into firing position. It will be seen that in this position the number of peas delivered at each shot will depend upon the inclination at which the blower is held. By holding the device so that the feed tube and barrel are side by side, the delivery of peas into firing position can be governed within certain limits at the will of the operator.

It will be seen that the cover 81 is so located that the opening therein is preferably in line with the opening 89, which in this case is substantially in line with the barrel or delivery tube. This opening in Fig. 14 comes at the end of the guide plate 83, but in Fig. 21 the guide plate 90 has no opening but is of such height that the air passes over it. In any of these forms the cover 91, as shown in Fig. 18, may have an inner partition 92 which restricts the passage of air through the cover and directs it through a hole 93. By placing the cover on the reservoir chamber, the hole 93 may be made to take a position directly in line with the opening 89, and with the firing tube or barrel which will have the effect above described, and the peas will be blown out as fast as they take their place in the firing position at the end of the firing tube so that under certain circumstances a continuous volley can be delivered. When, however, this cover is reversed so that the hole 93 is in line with the feed tube instead of the discharge tube or barrel the guide plate either having an opening in line with the tube 93 or having a continuous passage over the top as shown in Fig. 21, the air acts against the line of peas as they descend the feed tube toward firing position, and while the current of air is passing they are held in check and only such as have already reached firing position at that time are discharged, so that it is possible to deliver a single or double shot instead of a volley. The cover 91 can be suitably marked by stamping the word "Volley" on one side or on the bottom to distinguish one firing position from the other. The bead 94 and the projection 940 prevent the barrel being pushed in too far.

In the form shown in Fig. 18 the end of the reservoir or tube 95 is closed, and the barrel or delivery tube is inserted through an opening therein and guided into position along the part of the main body of the instrument which is bent over to form a curved surface 96. The feed tube is left open on the top or elsewhere to form a loading opening 97. The cover 91 which is shown in Fig. 18 is intended of course to cover this opening after the device is loaded and to make the reservoir substantially air-tight.

The partition 92 shown in Fig. 19 serves to check the passage of moisture from the mouth along the cover into the feed tube and barrel. By using a plurality of these partitions moisture can be prevented from passing even through the hole 93 in the last partition. Such a construction is indicated in Fig. 22, in which a plurality of partitions 98 is employed causing the air to pass alternately from one side of the cover to the other. The constructing partitions may be placed in the reservoir tube or feed tube instead of in the cover, as is indicated in Fig. 20, in which a guide plate 99 is employed having a central opening bounded by longitudinal moisture checks 100, and a transverse central moisture check 101. In all these forms and several of those which have been described above, the several guide plates act as a check against the passage of the peas or other projectiles into the mouth of the operator, and they also assist in preventing the passage of moisture into the reservoir or barrel.

It will be understood, of course, that this invention is not limited to a single feed tube or a single barrel, as in the forms shown on Sheet 2 a double feed tube or reservoir has been described, and in the form shown in Fig. 21 a single central reservoir or feed tube 102 is shown with two barrels 103 at the side.

Figure 23:
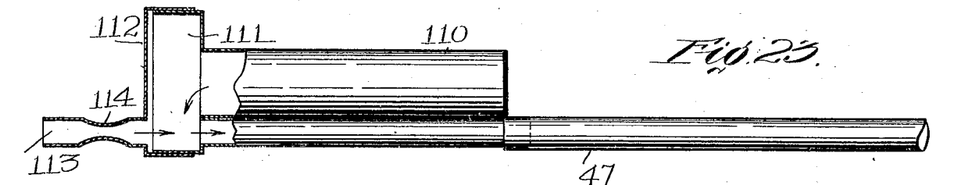
Fig. 23 is a side view partly in section showing a further modification.
Figure 24:
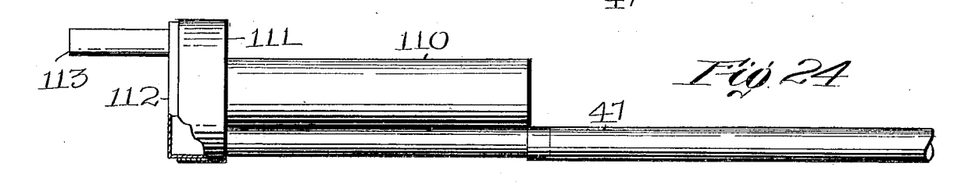
Fig. 24 is a similar view showing a slightly modified form with the parts in another position.
Figure 25:
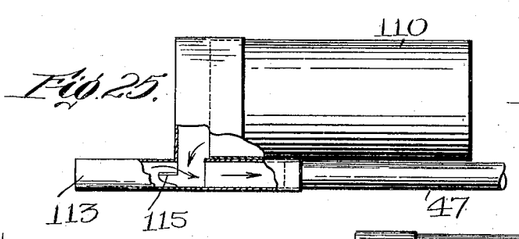
Fig. 25 is an elevation partly in section showing another form.
Figure 26:
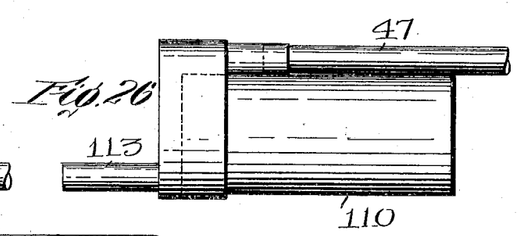
Fig. 26 is an elevation showing a modification of the form shown in Fig. 25.

Another type of devices coming within the scope of this invention is shown on the fourth sheet of the drawings. In this case the barrel 47 does not pass into or through the reservoir tube 110, or at least not through the center thereof, but it is formed outside the same and passes back so as to register with an opening in an enlargement 111 which does not constitute a part of the reservoir, but serves as a separate means for directing the projectiles into firing position without the use of a guide plate. The cover 112 fits the enlargement and these parts are so constructed that the peas entering from the reservoir are delivered into firing position before the end of the barrel and the mouth-piece 113 on the cover may be placed in line therewith. This mouth-piece may be flattened at 114 to form an obstruction as shown in Fig. 23 to prevent the passage of the peas into it and thence into the mouth of the operator, or it may have an obstruction 115 as shown in Fig. 25 for the same purpose. In these cases the reservoir is in front of the mouth-piece and these two parts are separate. In this case the barrel can be held either below the reservoir or above it as shown in Fig. 26, or at either side. The current of air from the mouth may be directed into the barrel as shown in Figs. 23 and 25; that is directly, or it can be directed in at another point as indicated in Fig. 24 which shows the cover as fitting inside the enlargement.

Figure 27:
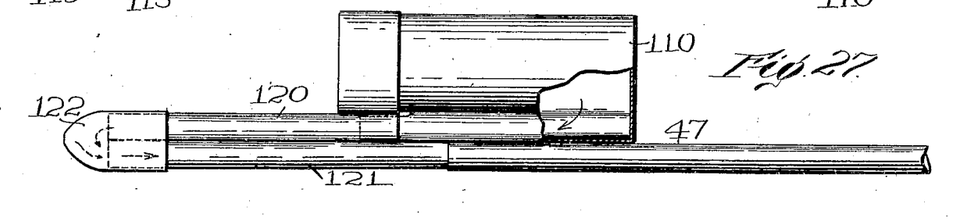
Fig. 27 is a side elevation of another modification similar to Fig. 25.

In Fig. 27 a form of the invention is shown in which the reservoir connects with a separate feed tube 120 which delivers the peas to the firing point at the rear of the barrel 47 or a continuation 121 thereof. The tubes 120 and 121 preferably are secured rigidly together. The reservoir 110 can be omitted so as to employ a long tube 120 as the reservoir or feed tube, and the loading can be done as in Fig. 18 for example by telescoping the casing 95 over the tubes 120 and 121. In either case a mouth-piece 122 connects the ends of the feed tube and barrel and the devices shown on the third sheet of the drawings can be employed in connection with the mouth-piece if desired. In all the forms shown on Sheet 4, the delivery barrels are situated outside the reservoir. It will be understood of course that the telescoping or any other kind of barrel can be employed in connection with these forms, and that many of the other features which have been described above may also be connected with them.

Figure 28:
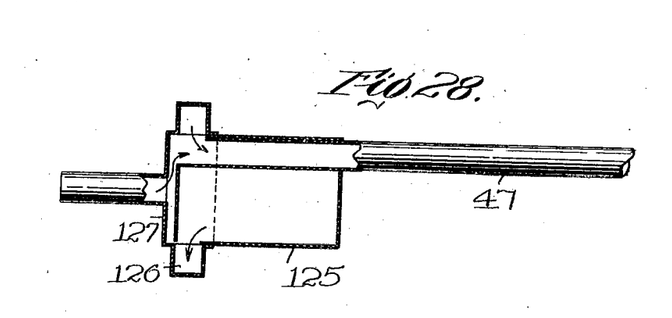
Fig. 28 is a side elevation partly in section showing a form of the invention having a rotary magazine.
Figure 29:
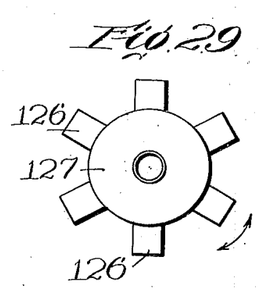
Fig. 29 is an end view thereof.

Referring now to Figs. 28 and 29, it will be seen that a reservoir 125 delivers the peas one by one into a series of magazine receptacles 126 which are mounted on a cover 127 which is intended to be rotated so as to deliver the projectiles into position at the rear of the barrel 47 for firing single shots.

Figure 30:
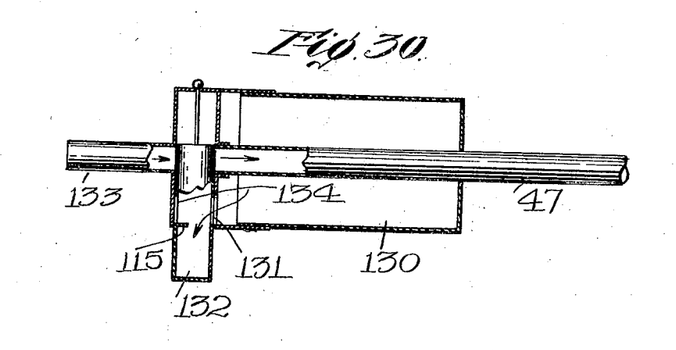
Fig. 30 is a side view partly in section showing a form having a reciprocating magazine.
Figure 31:
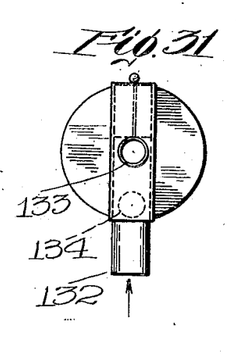
Fig. 31 is an end view of the same.

In the form shown in Figs. 30 and 31 the projectiles are delivered from the reservoir 130 through openings 131 into a reciprocating magazine 132 which can be raised to bring the projectiles into communication with the mouth-piece 133 and discharge tube 47, the opening 131 and another opening 134 registering with both of them. In this case the magazine may be made large enough to permit the delivery of a plurality of shots at a time.

It is to be observed that each of these several modifications has one or more of the features and advantages of the form shown in Figs. 1, 2, 3 and 4.

While I have illustrated and described a large number of modifications, I am aware that many changes may be made in them, and that many other forms can be constructed, and that features of each modification may be applied to others within the scope of this invention as expressed in the claims. Therefore I do not wish to be limited to all of the forms or details shown, but What I do claim is:—

1. As an article of manufacture, a blower for peas and the like comprising a reservoir for the projectiles, a discharge conduit extending into the reservoir and located at a distance from the walls thereof, a mouth piece communicating directly with said discharge conduit, and stationary means for directing the projectiles from the reservoir directly into the mouth-piece.

2. As an article of manufacture, a blower for peas and the like, comprising a reservoir for the projectiles, a discharge conduit extending into the reservoir and located at a distance from the walls thereof, a mouth piece communicating directly with said discharge conduit, and remote from the reservoir, and stationary means whereby the projectiles are delivered from the reservoir into the mouth-piece and from the mouth-piece into the discharge conduit.

3. As an article of manufacture, a blower for peas and the like, comprising a reservoir for the projectiles, a discharge conduit extending into the reservoir and located at a distance from the walls thereof, and a mouth piece communicating directly with said discharge conduit and receiving projectiles directly from the reservoir, said mouth-piece having a guide plate located therein for guiding the projectiles in the position in front of the discharge conduit.

4. As an article of manufacture, a blower for peas and the like comprising a discharge conduit, a receptacle or reservoir for the projectiles surrounding said conduit, and stationary means beyond the end of said reservoir for guiding the projectiles therefrom into the end of the conduit.

5. As an article of manufacture, a blower for peas and the like, comprising a discharge conduit, a receptacle or reservoir for the projectiles surrounding said conduit, means beyond the end of said reservoir for guiding the projectiles therefrom into the end of the conduit, and a mouth-piece connected with said means and having an opening between its end and the end of the conduit for directing air into the end of the conduit.

6. As an article of manufacture, a blower for peas and the like, comprising a discharge conduit, a reservoir for receiving the projectiles extending beyond a plurality of sides of the discharge conduit, and means for guiding the projectiles in a plurality of directions from the reservoir to the end of the discharge conduit.

7. As an article of manufacture, a blower for peas and the like, comprising a discharge conduit, a reservoir for receiving the projectiles extending beyond a plurality of sides of the discharge conduit, means for guiding the projectiles in a plurality of directions from the reservoir to the end of the discharge conduit, and means whereby air may be directed into the end of the discharge conduit.

8. As an article of manufacture, a blower for peas and the like, comprising a reservoir for the projectiles, a discharge conduit extending into the reservoir, a mouth piece communicating directly with said discharge conduit, means located at the end of the reservoir for holding the discharge conduit and means on the mouth-piece for holding one end of the discharge conduit.

9. As an article of manufacture, a blower for peas and the like comprising a discharge conduit, a receptacle or reservoir for the projectiles, and fixed means outside of said reservoir for guiding the projectiles therefrom to the end of the conduit, said reservoir having at the front end thereof means for removably holding the discharge conduit.

10. As an article of manufacture, a blower for peas and the like, comprising a discharge conduit, a receptacle or reservoir for the projectiles surrounding said conduit, and means outside of said reservoir for guiding the projectiles therefrom in a plurality of paths into position at the end of the conduit, said reservoir having means for guiding the discharge conduit, and said discharge conduit comprising a barrel slidably mounted in the reservoir and projecting from its front end.

11. As an article of manufacture, a blower for peas and the like, comprising a reservoir, a mouth-piece, and a discharge conduit consisting of a barrel, and a plurality of sections, each having an enlarged end fitting over the end of the barrel or another section, each of said enlarged portions being provided with an interior groove, and the barrel and opposite ends of the several sections being provided with a circumferential bead adapted to fit one of said grooves, whereby the sections may be placed in position and securely held therein and the escape of air substantially prevented.

12. As an article of manufacture, a blower for peas and the like, comprising a reservoir, a mouth-piece, and a discharge conduit consisting of a barrel, and a plurality of sections, each having an enlarged end fitting over the end of the barrel or another section, each of said enlarged portions being provided with an interior annular groove, and the barrel and opposite ends of the several sections being provided with a circumferential bead adapted to fit one of said grooves, one end of each section having a longitudinal slit in the end.

13. As an article of manufacture, a blower for peas and the like comprising a reservoir having a cover thereon fitting over the front end thereof, a barrel supported at one end by said cover, and a mouth-piece, said cover and reservoir each having an opening adapted to register with each other, whereby when one of them is moved on the other, the openings can be brought into registration for loading.

14. As an article of manufacture, a blower for peas and the like comprising a tubular reservoir having a tubular cover thereon fitting over the front end thereof, a barrel supported at one end by said cover, and a mouth-piece, said cover and reservoir each having an opening, whereby when one of them is turned on its axis, the openings may be brought into registration for loading, said reservoir and cover having a circumferential bead and groove registering with each other for preventing the discharge of air therefrom and for holding the parts removably in proper registration.

15. As an article of manufacture, a blower for peas and the like comprising a tubular reservoir having a tubular cover thereon, a barrel fitting over the front end thereof, a barrel supported at one end by said cover, and a mouth-piece, said cover and reservoir each having an opening, whereby when one of them is turned on its axis, the openings may be brought into registration for loading, said reservoir and cover having a circumferential bead and groove registering with each other for preventing the discharge of air therefrom and for holding the parts removably in proper registration, the reservoir having a longitudinal slit in the end.

16. As an article of manufacture, a blower for peas and the like, comprising a reservoir having an opening by which it may be loaded, a discharge conduit movably supported thereby at one end, a mouth-piece, and means connected with the reservoir for limiting the position of the discharge conduit.

17. As an article of manufacture, a blower for peas and the like comprising a reservoir having an opening in the front end thereof and provided with a tube extending longitudinally to said opening, a discharge conduit projecting from said tube, and a mouth-piece for directing air into the discharge conduit.

18. As an article of manufacture, a blower for peas and the like comprising a reservoir having an opening in the front end thereof and provided with a tube extending longitudinally to said opening, a discharge conduit removably fitting in said tube and projecting therefrom, and a mouth-piece for directing air into the discharge conduit.

19. As an article of manufacture, a blower for peas and the like comprising a reservoir, a barrel projecting into the same, a mouth-piece and means between the mouth-piece and reservoir for securing the end of the barrel in position.

20. As an article of manufacture, a blower for peas and the like comprising a reservoir, a barrel projecting into the same, a mouth-piece and a tubular member between the mouth-piece and reservoir for holding the end of the barrel, said tubular member and barrel together constituting a discharge conduit.

21. As an article of manufacture, a blower for peas and the like comprising a reservoir, a barrel projecting into the same, a mouth-piece, means between the mouth-piece and reservoir for centering the end of the barrel, and means between the mouth-piece and reservoir for discharging projectiles from the reservoir into the mouth-piece.

22. As an article of manufacture, a blower having a mouth-piece comprising a flattened portion provided with a central longitudinal rounded part for the reception of a discharge conduit, having an opening in line with the center of said rounded part and having passages on both sides of the rounded part for conducting projectiles to the discharge conduit.

23. As an article of manufacture, a blower comprising a discharge conduit, a mouth-piece into which the end of said conduit projects, and a guide-plate located in the mouth-piece and spaced from the end of the discharge conduit.

24. As an article of manufacture, a blower comprising a mouth-piece, a discharge conduit, and a guide plate spaced sufficiently to the rear of the end of the discharge conduit to permit projectiles to pass between them, and constituting means for directing the projectiles into firing position.

25. As an article of manufacture, a blower comprising a mouth-piece, a discharge conduit, and a curved guide-plate spaced sufficiently to the rear of the end of the discharge conduit to permit projectiles to pass between them, and constituting means for directing the projectiles into firing position, in a plurality of directions.

26. As an article of manufacture, a blower comprising a mouth-piece, a discharge conduit, a guide plate spaced sufficiently to the rear of the end of the discharge conduit to permit projectiles to pass between them, and constituting means for directing the projectiles into firing position, and a moisture-check located adjacent to the guide-plate.

27. As an article of manufacture, a blower comprising a mouth-piece, a discharge conduit, a guide plate spaced sufficiently to the rear of the end of the discharge conduit to permit projectiles to pass between the guide plate and discharge conduit, and constituting means for directing the projectiles into firing position, and a moisture-check located adjacent to the guide-plate and between said guide-plate and the rear end of the mouth-piece.

28. As an article of manufacture, a blower comprising a discharge conduit, a guide plate spaced sufficiently to the rear of the end of the discharge conduit to permit projectiles to pass between the guide plate and discharge conduit, and constituting means for directing the projectiles into firing position, and a moisture-check located at the rear of the guide-plate and consisting of two longitudinal plates connected with the guide-plate and a transverse plate spaced from them.

29. As an article of manufacture, a blower comprising a mouth-piece, a discharge conduit, and a guide-plate spaced sufficiently to the rear of the end of the discharge conduit for directing the projectiles into firing position, said guide-plate also constituting means for preventing the projectiles from passing back into the rear end of the mouth-piece and having a passage for permitting air to be discharged through the mouth-piece into the discharge conduit.

30. As an article of manufacture, a blower comprising a reservoir, a discharge conduit comprising a tube projecting from the reservoir, means at the other end of the reservoir for receiving projectiles and directing them into the tube, and a mouth-piece connected with said means.

In testimony whereof I have hereunto set my hand, in the presence of two subscribing witnesses.

ALBERT HARRY WHEELER.

Witnesses:
  ALBERT E. FAY,
  C. FORREST WESSON.